Nov. 8, 1927.
C. B. HAY
VINE GATHERING MACHINE
Filed Nov. 8, 1926
1,648,767
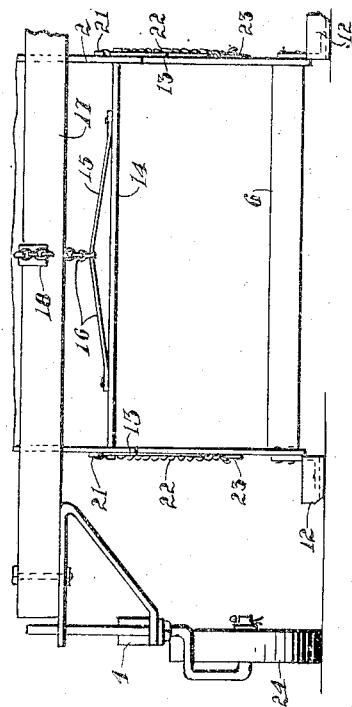
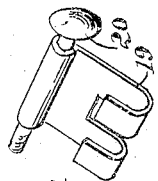
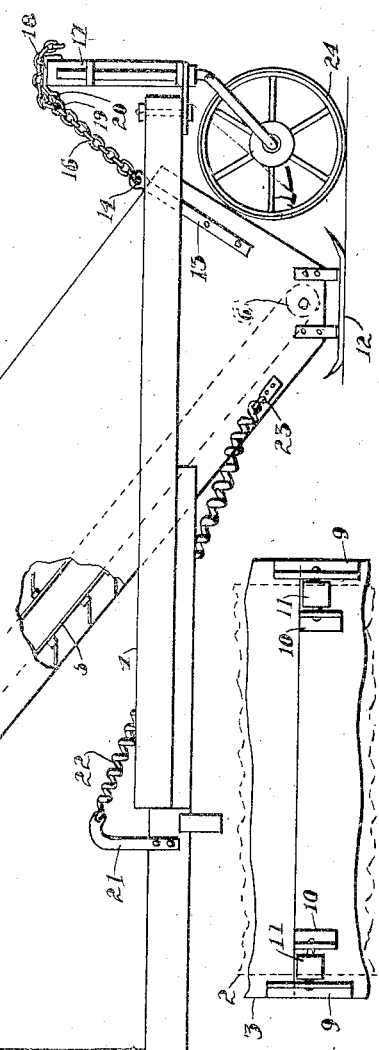
INVENTOR
Colin B. Hay
John A. Naismith
ATTORNEY Patented Nov. 8, 1927.

1,648,767

UNITED STATES PATENT OFFICE.

COLIN B. HAY, OF SAN JOSE, CALIFORNIA.

VINE-GATHERING MACHINE.

Application filed November 8, 1926. Serial No. 147,083.

This invention relates particularly to the means provided for carrying and supporting the draper frame of a vine gathering machine.

It is one object of the invention to provide a draper frame supporting mechanism that will permit the said frame to adapt itself readily to inequalities of the ground over which it is moved.

It is another object of the invention to provide a mechanism of the character indicated that will so control the movements of the draper frame as to prevent it from being subjected to sudden shocks.

It is also an object of the invention to provide a simple mechanism for the purpose indicated, and one that will be economical to manufacture, adjustable within required limits, and highly efficient in its practical application.

In the drawing:—

Figure 1 is a side elevation of a portion of a vine gathering machine illustrating my invention.

Figure 2 is an end elevation of the same.

Figure 3 is a detail section on line 3—3 of Figure 1, parts being broken away.

Figure 4 is a perspective detail of the chain hook.

Referring more particularly to the drawing, I show at 1 a portion of the framework of a combined harvester and thresher in conjunction with which this improved draper frame 2 is used, the numeral 3 designating the part receiving the vines from the draper frame, and the numerals 4—4 designating the side bars supporting the lower and forward end of the said frame. The draper frame 2 carries a draper 5 mounted on rollers 6 and 7 and operated by a pulley and belt 8. The particularities of these features are not described as they are constructed in the manner well known in devices of this kind.

On the part 3 of the supporting frame are mounted bars 9 extending vertically one on each side of the frame 2 to prevent lateral movement thereof. Associated with each part 9 is a bearing 10, and in each part 9–10 is mounted a roller as shown at 11. These rollers 11 are so positioned that they support the upper end of frame 2 and yet permit a rising and falling movement thereof.

On each side of the lower end of the frame 2 is mounted a shoe 12. Supports 13 are shown mounted on the upper forward ends of the frame to support a cross bar 14. On the cross bar 14 is secured a strap 15 bent upwardly at its center and to which is attached a chain 16. On the cross bar 17 forming a part of the forward end of the supporting frame 1 is mounted a strap 18 to which is secured a hook 19 by means of a bolt 20. This hook is positioned in the center of the forward end of the structure whereby to receive the chain 16.

On each side of the frame 1 I show upstanding bars 21 to which are attached springs 22, the forward ends of the springs being attached to the frame 2 by means of hooks 23 mounted thereon adjacent the shoes 12.

By means of this construction whenever an elevation or depression is encountered the draper frame is kept in proper spaced relation to the ground in the first instance by the shoes 12 and prevented from travelling down too far in the second instance by the chain 16. The rollers 11 cooperate with the shoes 11 to permit the frame 2 to ride over such obstructions as it may meet, and the springs 22 control the movement of the frame and let it down an incline smoothly and without a jar.

The front end of the frame 1 is carried by the wheel 24 and the thresher frame not shown, and by means of the chain and hook construction at 16–19 the frame 2 may be supported in any desired relation thereto.

This construction permits a free riding motion of the frame 2 over the ground over which it is drawn, and yet it is so controlled as to move only within definite limits without danger of injury thereto.

It is to be understood, of course, that while I have herein shown and described but one specific embodiment of the invention, changes in form, construction and method of assembly and operation may be made within the scope of the appended claims.

I claim:

1. In combination with the supporting frame of a vine gathering machine, a draper frame, a roller support inserted between the supporting frame and the rear end of the draper frame, a flexible draft element connecting the supporting frame and the forward end of the draper frame, and supporting shoes mounted on the draper frame.

2. In combination with the supporting frame of a vine gathering machine, a draper frame having one end supported on the supporting frame and the other end provided with shoes adapted to engage the ground, and a flexible draft connection between the draper frame and the supporting frame.

3. In combination with the supporting frame of a vine gathering machine, a draper frame having one end supported on the supporting frame and slidably movable relative thereto and the other end provided with shoes adapted to engage the ground, a flexible draft connection between the draper frame and the supporting frame, and a resilient control inserted between the supporting frame and draper frame for supporting the latter against a sudden forward movement.

4. In combination with the supporting frame of a vine gathering machine, rollers mounted thereon, a draper frame supported at one end by said rollers, shoes mounted upon the other end of said draper frame, a flexible draft connection between the forward end of said draper frame and said supporting frame, and a resilient member connecting the forward end of the said draper frame with the supporting frame and exerting a pull upon the draper frame in a direction opposite to the pull of the flexible draft connection.

COLIN B. HAY.